O. E. GROSHELL.
INDICATOR.
APPLICATION FILED JAN. 21, 1920.
1,432,460.
Patented Oct. 17, 1922.
12 SHEETS—SHEET 1.
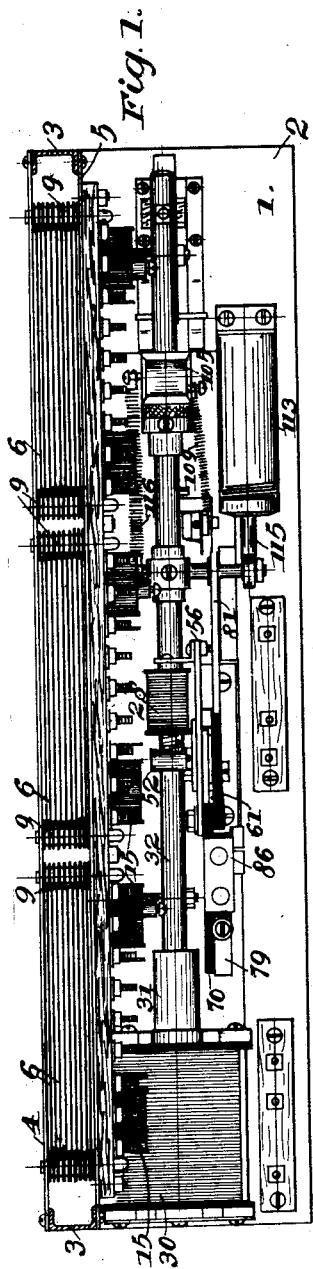
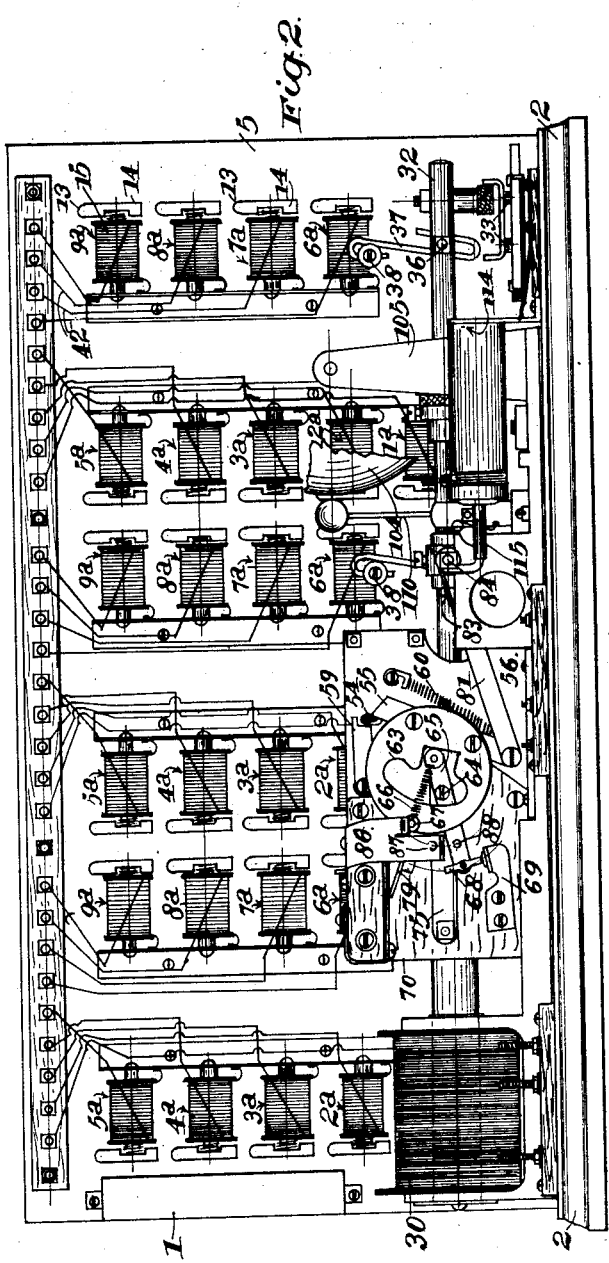
INVENTOR
Oscar E. Groshell.
BY
ATTORNEY INVENTOR
Oscar E. Groshell
BY
ATTORNEY

O. E. GROSHELL.
INDICATOR.
APPLICATION FILED JAN. 21, 1920.

1,432,460.

Patented Oct. 17, 1922.
12 SHEETS—SHEET 3.

INVENTOR
Oscar E. Groshell
BY
ATTORNEYS.

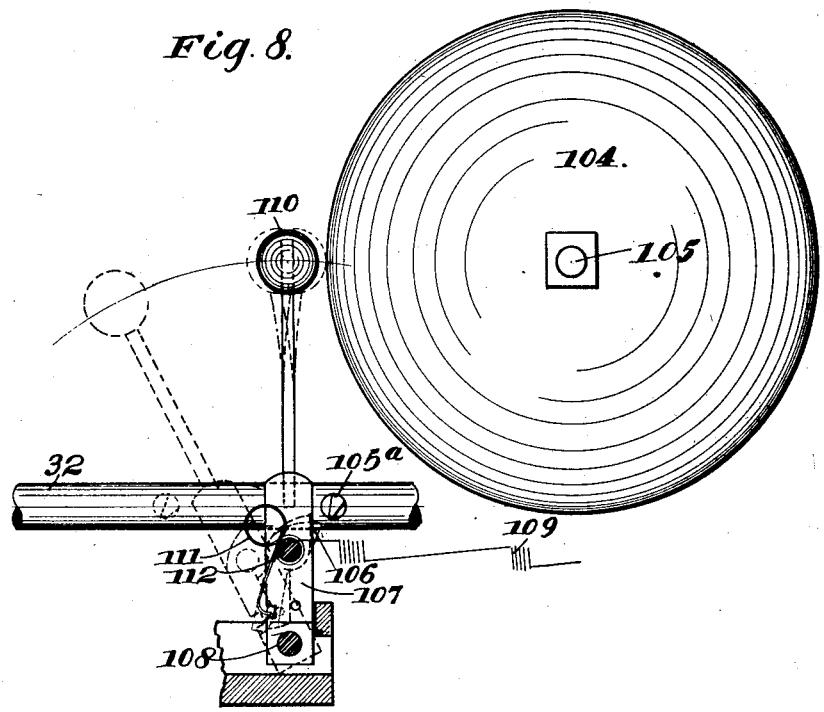
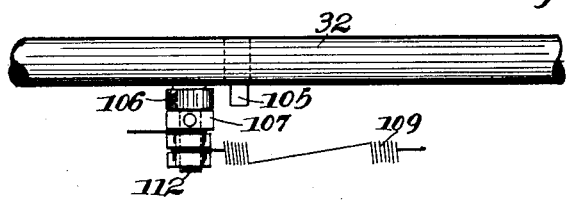

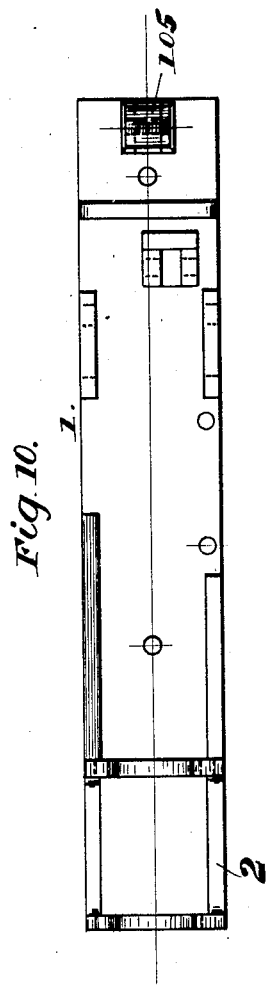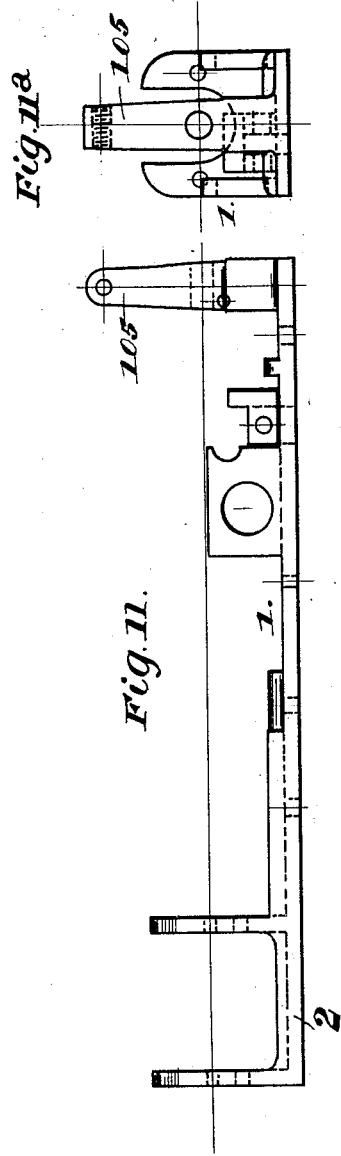

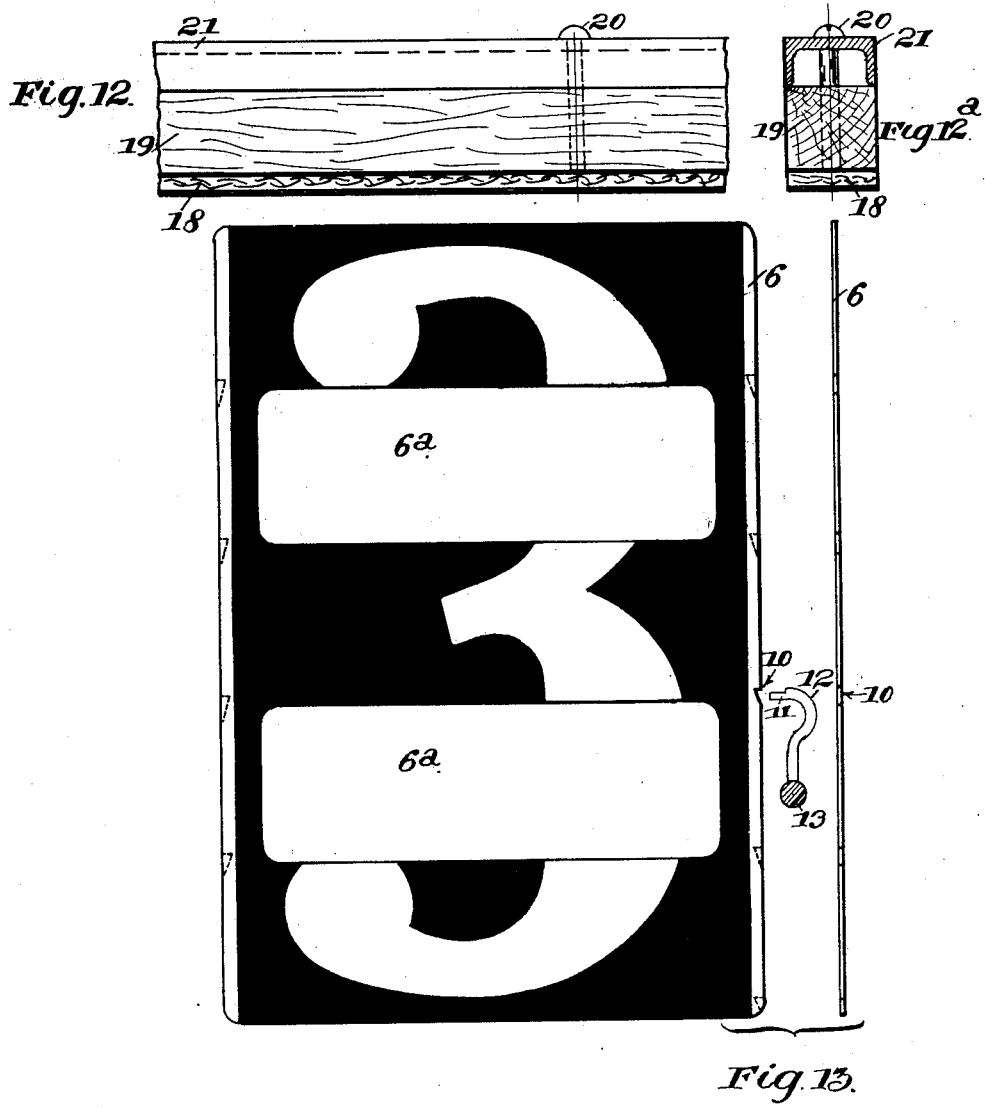

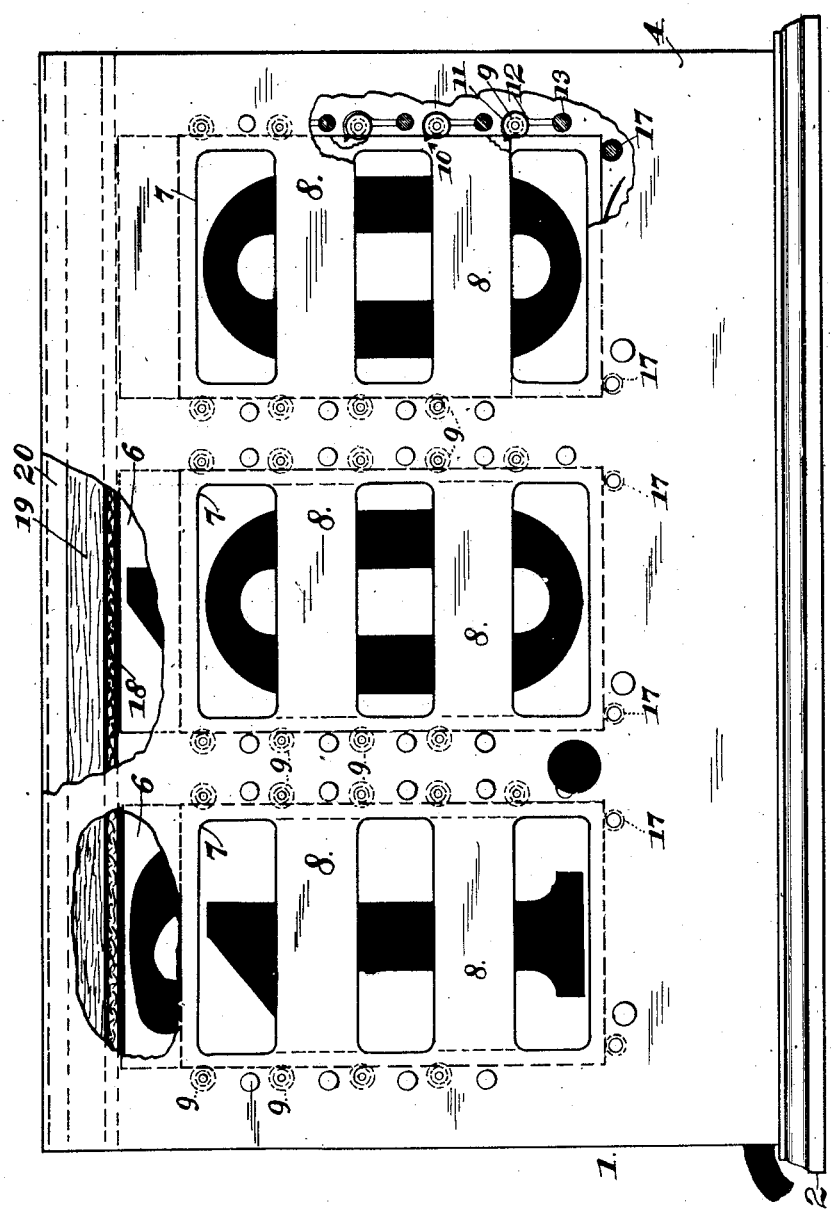

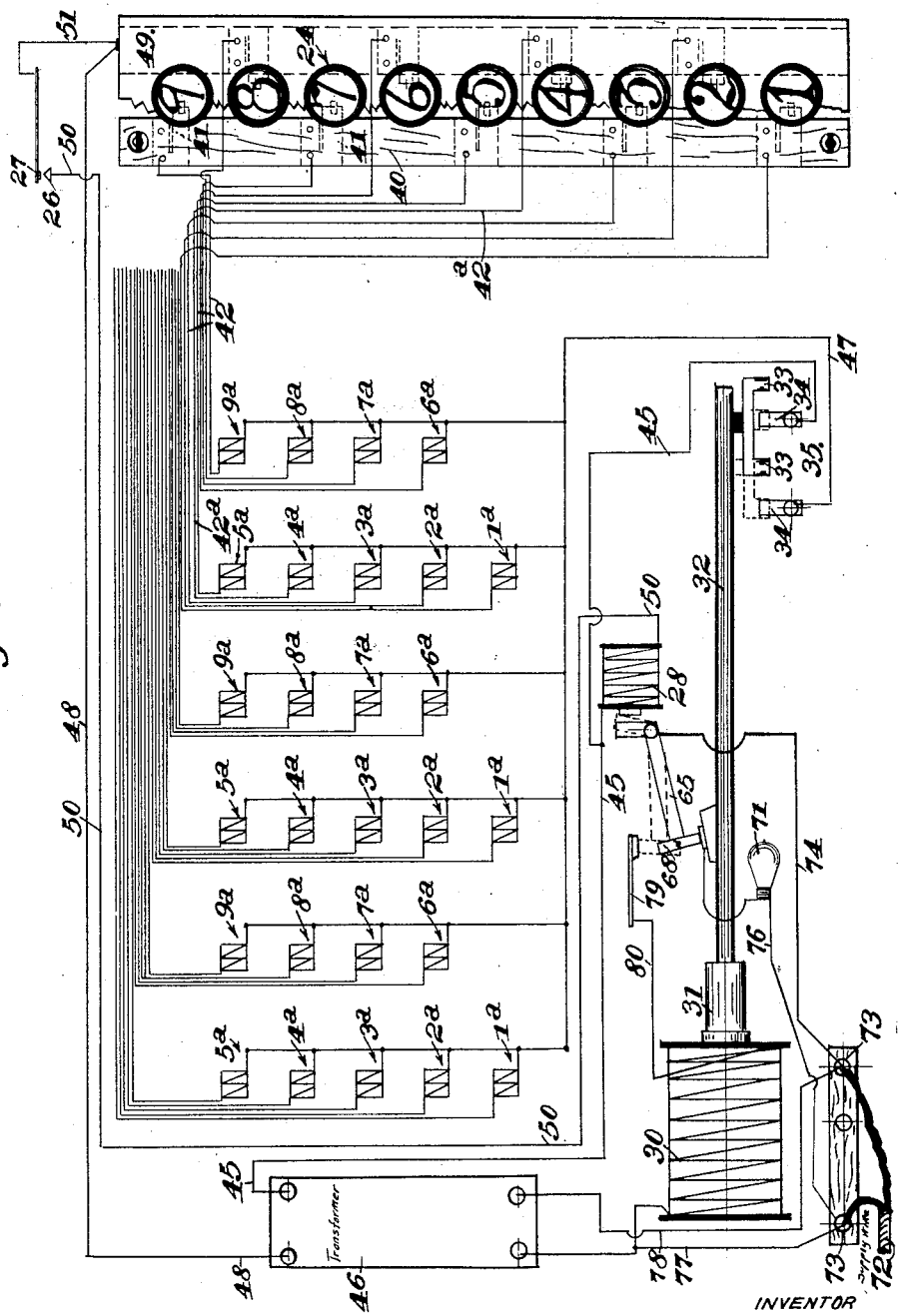

O. E. GROSHELL.
INDICATOR.
APPLICATION FILED JAN. 21, 1920.

1,432,460.

Patented Oct. 17, 1922.
12 SHEETS—SHEET 9.

INVENTOR
Oscar E. Groshell.
BY
ATTORNEYS

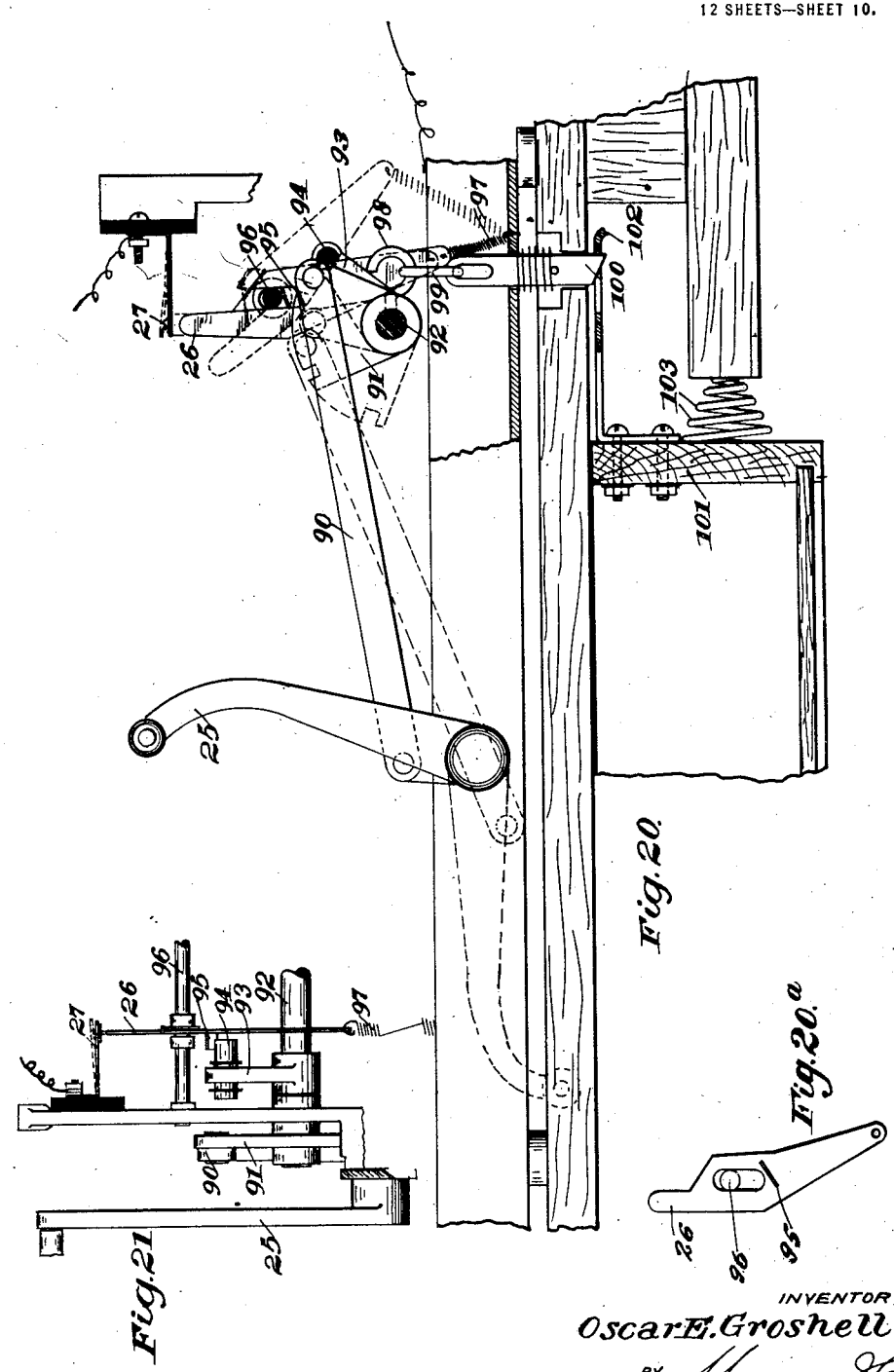

O. E. GROSHELL.
INDICATOR.
APPLICATION FILED JAN. 21, 1920.
1,432,460. Patented Oct. 17, 1922.
12 SHEETS—SHEET 12.
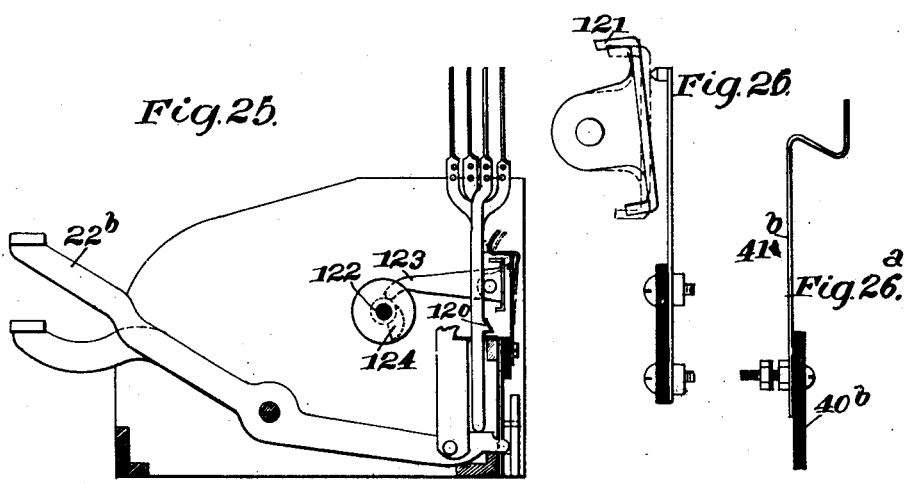
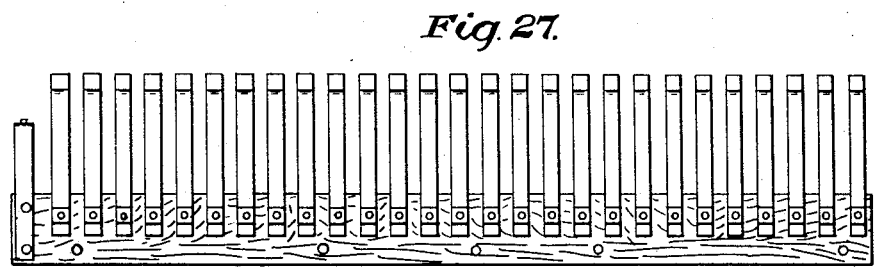
INVENTOR
Oscar E. Groshell.
BY
ATTORNEYS.

Patented Oct. 17, 1922.

1,432,460

UNITED STATES PATENT OFFICE.

OSCAR E. GROSHELL, OF SALT LAKE CITY, UTAH.

INDICATOR.

Application filed January 21, 1920. Serial No. 353,105.

*To all whom it may concern:*

Be it known that I, OSCAR E. GROSHELL, a citizen of the United States, and a resident of Salt Lake City, in the county of Salt Lake and State of Utah, have invented certain new and useful Improvements in Indicators, of which the following is a specification.

My invention relates to improvements in indicating devices for cash registers, adding machines, and the like, and it consists in the constructions, combinations, and arranged herein described and claimed.

One of the foremost objects of my invention is to provide an indicating device having large numerals, corresponding to smaller numerals in a cash register or similar device, the arrangement being such that when an amount is rung up on the cash register, the indicating device will register the same amount in large numerals in a place where the amount of the sale can be observed by every one.

Another object of the invention is to provide an indicating device of the character described, which can be used in connection with cash registers, adding machines, and devices of a similar nature, without materially altering the construction of said devices in order to operatively embody the indicating device therein.

A further object of the invention is to provide a novel arrangement whereby the restoration of indicator plates of a previous registration, is insured before certain of the drop magnets become active to drop the indicating plate of a following registration.

Other objects and advantages will appear in the following specification, reference being had to the accompanying drawings, in which:—

Figure 3:
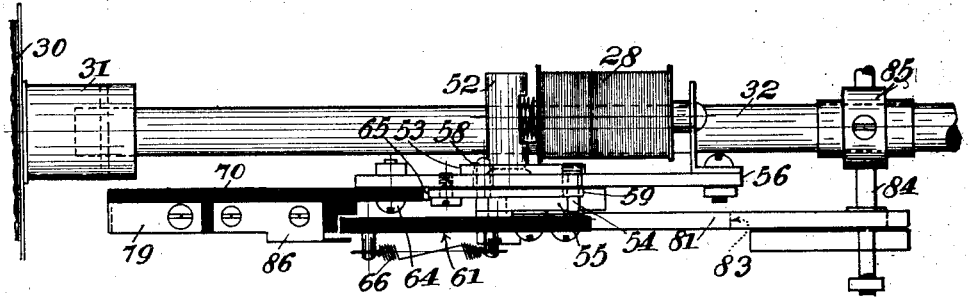
Figure 4:
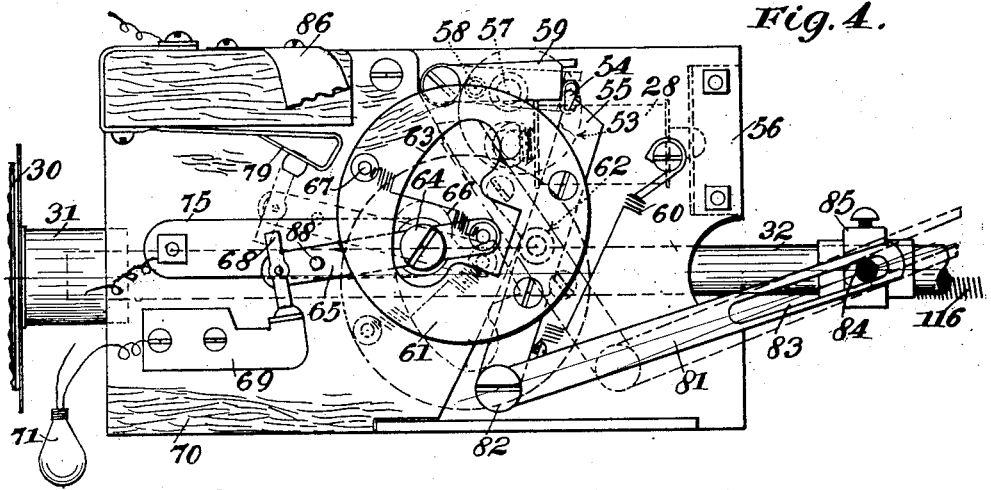
Figure 5:
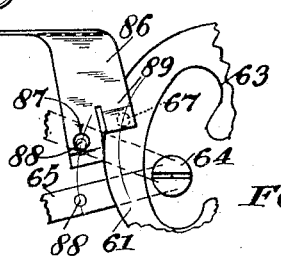
Figure 6:
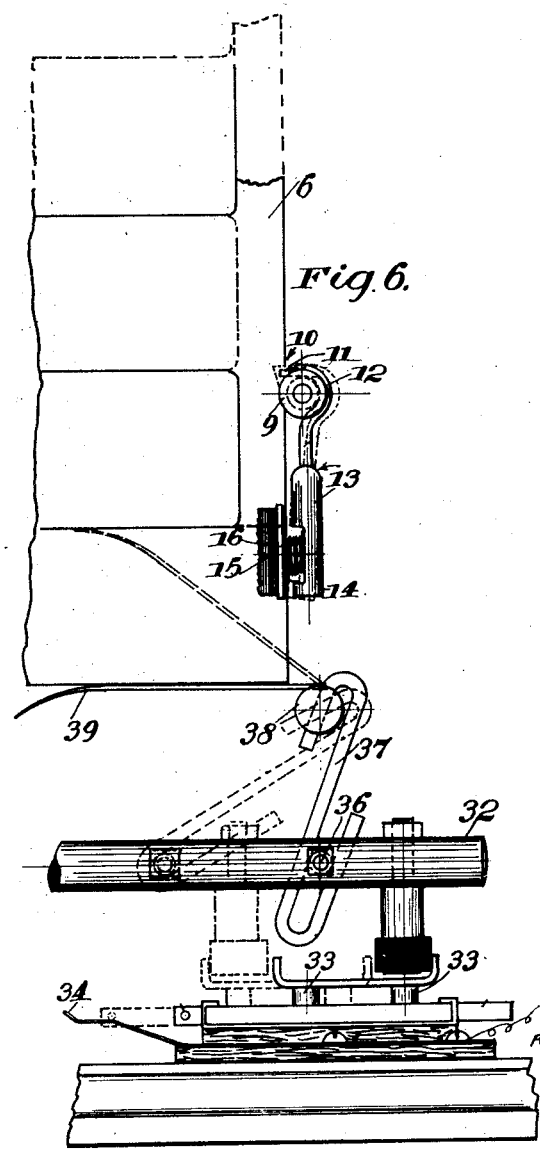
Figure 7:
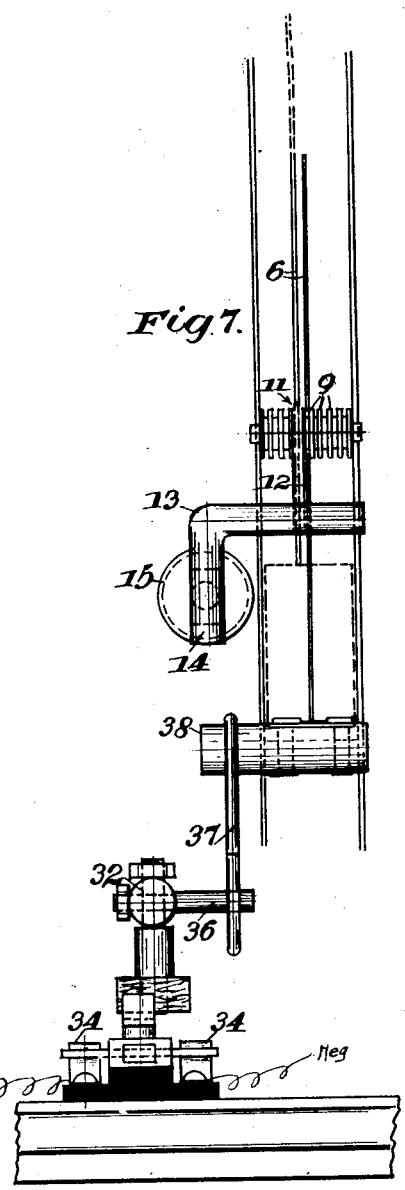

Figure 1 is a plan view of the improved auxiliary indicator, the cabinet being removed, Figure 2 is a rear elevation of the auxiliary indicator, Figure 3 is a plan view of a remote control switch, which forms a part of the improved indicator, Figure 4 is a front elevation thereof, Figure 5 is a detail view of the spring lock which forms a part of the remote control switch, Figure 6 is a detail side elevation showing the mechanism operatively associated with the actuator shaft, by means of which indicator plates are restored before the drop magnet switch is operated to release other indicator plates of a following registration, Figure 7 is an end elevation of the structure in Figure 6, Figure 8 is a front elevation, parts being shown in section of the bell ringing mechanism, Figure 9 is a detail plan view of the clapper and its associated mechanism in Figure 8.

Figure 16:
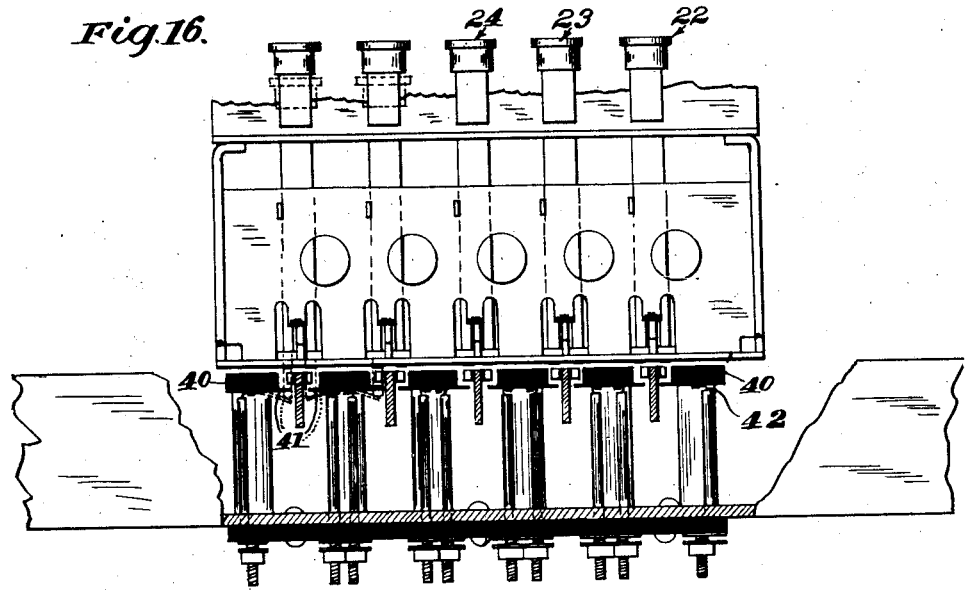
Figure 17:
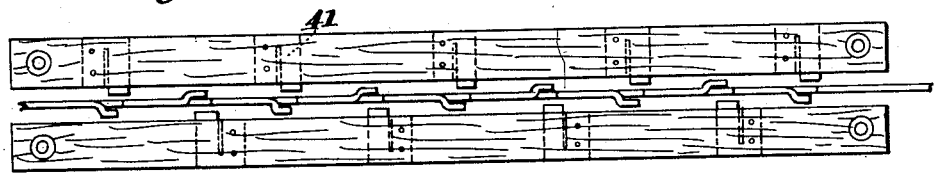
Figure 18:
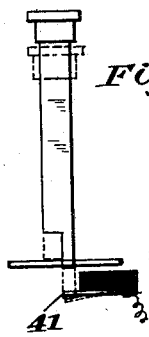
Figure 19:
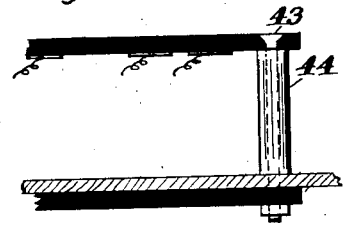
Figure 22:
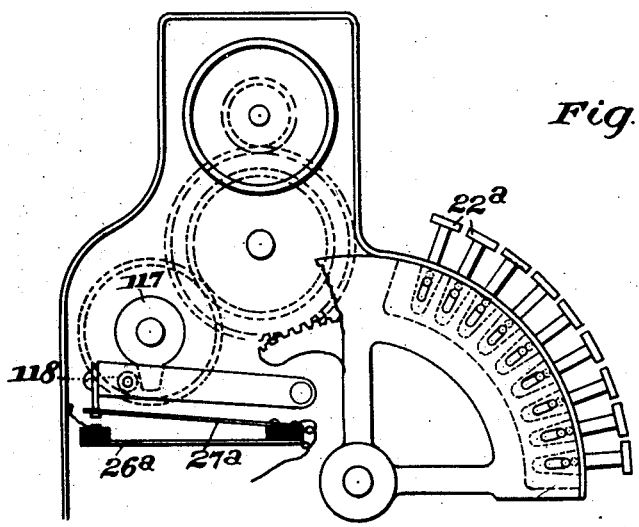
Figure 23:
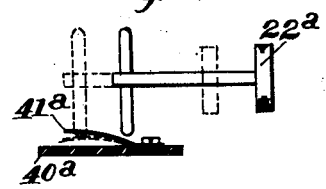
Figure 24:
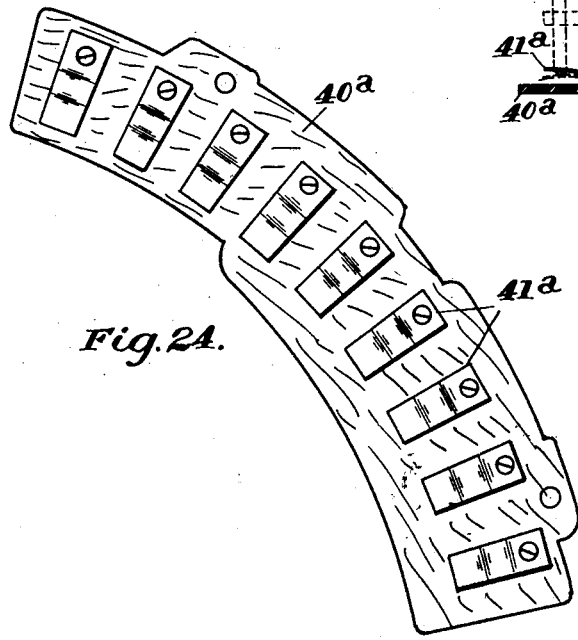

Figure 10 is a plan view of the base on which certain parts of the mechanism is mounted, Figures 11 and 11ᵃ are a side and end elevation of the base respectively, Figures 12 and 12ᵃ are respectively a side elevation and cross section of a cushion structure for the indicator plates, Figure 13 is a detail view of one of the indicator plates, Figure 14 is a front elevation of the improved auxiliary indicator, illustrating the appearance of a registered sale, Figure 15 is a diagram showing how the improved indicator is connected to an adding machine, cash register or similar device, Figure 16 is a detail sectional view showing the arrangement of contacts and keys in a registering device, as for example an adding machine, Figure 17 is a detail plan view of certain of the contacts in the structure illustrated in Figure 16, Figure 18 is a detail view of one of the keys, showing how a contact is engaged, Figure 19 is a detail sectional view showing how the contact and insulation are supported in the frame of the registering device in Figure 16, Figure 20 is a side elevation, with parts shown in section, showing the contact making and cash drawer releasing mechanism described below in connection with Figure 15, Figure 20ᵃ is a detail view of the switch finger 26 hereinafter referred to, Figure 21 is a detail end elevation of parts of the structure in Figure 20, Figure 22 is a detail side elevation, with parts removed, of a well known type of cash register, and illustrating the arrangement of certain contacts described below, Figure 23 is a detail sectional view showing how a portion of an electrical circuit is completed by depressing one of the cash register keys, Figure 24 is a detail view of the contact strip which cooperates with a row of the cash register keys, Figure 25 is a sectional view illustrating a further slight modification by means of which the invention can be applied to another well known type of cash register, Figures 26 and 26ª are detail views of certain of the contacts illustrated in Figure 25, Figures 27 and 28 are plan views showing arrangements of the contacts in Figures 26 and 26ª, and Figure 29 shows a portion of one of the contacts in Figure 28, in detail.

The present invention is an improvement on my patent on auxiliary indicating devices for cash registers, granted February 27, 1917, Patent #1,217,753. In that patent, one of the important features resided in certain ringing mechanism whereby the amount of each sale was audibly announced in addition to the registration of the amount of the sale in large numerals. In the present invention, this ringing mechanism is eliminated because it was found to be too slow for certain purposes. Other improvements are also embodied in the present invention and in order that all of the parts, together with the mode of operation thereof, may be readily understood, they are described in regular order. Attention is first directed to the frame 1.

This frame consists of the base 2, end uprights 3, front 4 and back 5. The back, and the structure carried thereby, is shown in Figure 2. The front 4 is clearly shown in Figure 14.

In the present instance, the front 4 is arranged to show three indicator plates. Obviously, a greater or lesser number of plates may be shown by arranging the front accordingly. There is one set of indicator plates 6 behind each indicator unit in Figure 14.

Each indicator unit comprises slotted portions 7 and solid portions 8. This structure is the same as that in my other patent, but it may be briefly described as being the novel means whereby substantially a whole numeral on an indicator plate 6 is displayed without necessitating the movement of the indicator plate throughout the entire length of the opening in which it is to appear. The indication "$1.00" now appears in Figure 14. It is only necessary to move each indicator plate up the distance of the width of a solid portion 8, when all of the numerals will disappear.

Rollers 9 guide the various indicator plates 6. The rollers are grooved, as clearly shown in Figure 7, so as to receive the vertical edges of the indicator plate. There are nine indicator plates in each set, having numerals running from "1" to "9" painted or otherwise shown thereon. A "0" is painted on the back 5, behind each set of openings, so that when all of the indicator plates are up, only zeros appear.

One of the indicator plates 6 is shown in detail in Figure 13. This plate, which is suitably cut out in places to correspond with the openings 7 in the front 4 in Figure 14, has a notch 10 on one edge. There is only one notch in each indicator plate. The other notches, shown in dotted lines in Figure 13, are intended to show where the notches come in the other nine plates.

A support 11 is arranged to enter the notch 10 and hold the indicator plate up. This support is made on the end of a hook 12 which is pivoted at 13. The hook terminates in an armature 14 which is arranged to be attracted by a drop magnet 15. When the drop magnet is energized, the hook 12 is rocked on the pivot 13, the support 11 is withdrawn from the notch 10, and the indicator plate 6 drops.

It is to be observed that the hook 12 works in the same groove of one of the rollers 7 on one side, in which the companion edge of the plate 6 works. The grooved roller therefore constitutes a guide not only for the plate itself, but also for the hook. A spring 16 between the armature 14 and core of the magnet 15, keeps the armature from sticking after the magnet is deenergized. The arrangement is shown in Figure 6.

Stops 17 support the indicator plates 6 when they are down, and cushions 18 along the top, prevent the making of noise when the plates are raised to the concealed position by means of the plate lifting mechanism described below. In Figure 12, the cushion 18 is shown to be suitably affixed to the lower edge of a wooden rail 19, which in turn is secured at 20, to the channel iron 21 running along the top of the frame.

The plate lifting mechanism comes into operation shortly before a subsequently selected set of indicator plates are released for registration, as in Figure 14. The clearing of the sight opening before a new set of plates is allowed to appear, is thus insured.

In order to understand how and when the plate lifting mechanism comes into operation, as referred to above, it is necessary to briefly describe the operation. To this end, attention is directed to Figures 4, 6, 15, 16 and 20. Figure 20 shows a part of a cash register, adding machine, or other similar device with which the auxiliary indicator cooperates.

There is a series of rows of keys, indicated 22, 23, 24, etc., in the cash register or adding machine. The first row contains nine keys and constitutes the "units" column. The second and third rows also contain nine keys each, and respectively constitute the "tens" and "hundreds" columns. When any one of the keys is depressed, it remains in the depressed position until it is subsequently released, by mechanism which forms a part of the machine and constitutes no part of the invention. Therefore, it is sufficient to say that a key remains depressed until released.

Consider Figure 15. Three banks of magnets are shown, respectively designated "units," "tens" and "hundreds." These are the magnets 15 formerly referred to, but in the present instance, in order to indicate the magnets which correspond to the keys in the various columns of the adding machine, they are designated $1^a$, $2^a$, $3^a$, $4^a$, $5^a$, $6^a$, $7^a$, $8^a$, and $9^a$.

Should the operator desire to register a sale of a value amounting to $4.29, he presses the keys "4," "2" and "9," which remain depressed. He then pulls the handle 25 in Figure 20, back to the dotted line position, whereupon the switch finger 26 disengages the spring contact 27 and momentarily completes a circuit through the release magnet 28 in Figure 15.

The energization of the release magnet 28 causes the switch arm 65 to be moved up into the dotted line position, in which position a circuit is completed through the actuated solenoid 30. The energization of the solenoid draws the core 31 in, carrying with it the actuator shaft 32. The actuator shaft 32 carries movable contacts 33, which are adapted to engage fixed contacts 34 of the main drop magnet switch 35.

Immediately upon commencement of the inward movement of the actuator shaft 32 and before the contacts 33, 34 come into engagement, any indicator plate that may be down, will be raised by the mechanism in Figure 6. Here the actuator shaft 32 is shown to have connection at 36, with the rock link 37, which is carried by the rock shaft 38. The rock shaft carries a lift finger 39 which moves to the dotted line position when the actuator shaft 32 moves inwardly as described, so as to raise any indicator plate that may be down, into position to be engaged and held by its operatively associated supporter pawl 11.

The foregoing is a general idea of the operation of the auxiliary indicator, and the operation is the same whether the indicator is attached to a cash register, adding machine, or any similar device. The various structures involved in the above description, are now described in detail. Strips of insulation 40, disposed at the sides of the rows of keys in Figure 16, support contacts 41 from which wires 42 lead to the various drop magnets shown in Figure 15.

The strips 40 are supported by means of screws 43 which pass through, as shown in Figure 19, and sleeves 44. Figure 18 shows how one of the contacts 41 is engaged by a key when it is depressed.

It is important to note that electrical circuits through the various drop magnets representing keys on the keyboard of the cash register, are not energized upon the depression of said keys. This the reader can see at once by following out the circuits in Figure 15. A wire 45 leads from one terminal of the transformer 46 to one of the fixed contacts 34 of the main drop magnet switch 35. A wire 47 leading from the other contact 34, is common to all of the drop magnets.

A common return wire 48 leads from the negative terminal of the transformer to the frame 49 of the adding machine, where it is grounded. Assume that one of the keys in Figure 15 is depressed. The shank of the key will engage the corresponding contact 41, thus completing a portion of the circuit at that point. But the other portion of the circuit is still open at the main drop magnet switch 35, and therefore it can be seen that none of the drop magnets can be energized until the actuator shaft 32 is moved toward the left, in which movement the main drop switch 35 is closed. This also makes it clear that the return of any indicator plate which may be down, is insured before other indicator plates are dropped.

Upon the momentary closure or engagement of the contact members 26 and 27, current flows from one terminal of the transformer 46 over the wire 45, through the release magnet 28, over wire 50 to the switch finger 26, through contact 27, over wire 51 to the frame 49, and from thence over the wire 48 back to the other terminal of the transformer.

Now consider Figures 3, 4 and 5 in connection with Figure 15. The release magnet 28 is momentarily energized. The armature 52 is attracted, thereby partially rotating the latch disk 53 by which it is carried, and causing the lifting of the latch 54 from engagement with the end of the arm 55. The latch 54 is carried by the disk 53, and extends through a suitable opening in the plate 56 on which the disk is pivotally mounted at 57.

A pin 58 carried by a normally raised locking pawl 59, causes the movement of the locking pawl into the dotted line position by virtue of the connection of the pin with the latch disk 53 on back of the plate 56. Therefore, although the arm 55 is released by the latch 54, it is immediately caught and again held by the locking pawl 59 until the release magnet 28 is deenergized.

All this takes but an instant and the arm 55 is again released so that it may move to the dotted line position.

A spring 60 causes the arm 55 to move into this position. The arm carries a switch disk 61, of insulating material, and this disk moves with the arm. Both are pivoted at 62. The disk has an opening 63 through which the pivot screw 64 of the switch arm 65 can be reached.

A spring 66 joins the extension of the switch arm 65 to the lock stud 67 on the disk 61. Normally, the spring 66 holds the contact 68 of the switch arm 65 in engagement with the light contact 69 on a plate 70. The plate 70 is made of insulating material, whereas the plate 56 is of metal.

When the contacts 68 and 69 engage as just described, a circuit is completed through the lamp 71. The circuit connections of the lamp 71 are shown in Figure 15. A supply wire 72 joins the binding posts 73. One wire 74 runs from one of the binding posts to the plate 75 on which the switch arm 65 is pivoted. Another wire 76 runs from the other binding post to the lamp, and from the lamp to the light contact 69 on the plate 70.

Other wires 77 and 78 run from the binding post 73 to the terminals of the transformer 46. The changing of position of the switch disk 61 in the manner described, causes the shifting of the switch arm 65 to the dotted line position in Figure 4, by virtue of the action of the spring 66 which then pulls on the extension of the switch arm 65 from below the pivot 64, instead of from above. The contact 68 is thereby moved into engagement with the fixed solenoid contact 79 so that current flows as follows: from one binding post 73 over the wire 74 to the switch arm 65, contacts 68, 79, wire 80, through the actuator solenoid 30 and back to the other binding post 73 over the wire 77, to which the other terminal of the solenoid is connected.

Reverting for a moment to the structure in Figure 4, the changing of position of the switch disk 61 also changes the position of the return arm 81, by means of which the switch mechanism in Figure 4 is restored to the normal position upon the energization of the actuator solenoid 30.

The return arm is pivoted to the arm 55 at 82. It has a slot 83 which receives the pin 84 which extends laterally from the adjustable collar 85 on the actuator shaft 82. Upon being shifted to the dotted line position, the base of the slot 83 moves up close to the pin 84, and when the solenoid 30 is energized, as described above, the shaft 32 moves toward the left causing the return movement of the arm 81 and the parts operatively associated therewith, to the normal position.

It is necessary, however, that the contacts 68, 79 are not prematurely separated. For this purpose, the spring lock plate 86 in Figure 5 is provided. One portion of the spring lock 86 has an aperture 87 to receive the holding stud 88 of the switch arm 65, when the latter is in the upper or dotted line position. The engagement of the holding stud 88 with the aperture 87, prevents the shifting of the switch arm 65 even after the spring 66 passes beyond the pivotal center 64. The engagement is broken when the lock stud 67 moves beneath the portion 89 of the spring lock 86, causing the spring lock to be bent outwardly and thereby to release the switch arm 65. The spring 66 then returns the switch arm to the original position, whereupon the lamp 71 is lighted by means of the connections described above.

As the actuator shaft 32 moves toward the left by virtue of the energization of the solenoid 30, any plates 6 that may be down, are lifted as described in connection with Figure 6, and finally the various contacts of the main drop magnet switch 35 are brought into engagement so that certain of the drop magnets are energized, such magnets being represented by keys previously depressed on the keyboard of the adding machine or cash register. Take, for example, the key "4" in the "hundreds" column in Figure 15. Assume this key to be depressed and the shank thereof to be in engagement with its companion contact 41. The various contacts 33, 34 of the main switch 35, are in engagement.

Current flows from the positive terminal of the transformer 46, over the wire 45, through the closed contact 33, 34, over wire 47, to the drop magnet $4^a$ in the "hundreds" column, over the wire $42^a$ to the contact 41 at the side of the key "4," through frame 49 and over the common return wire 48 to the negative terminal of the transformer.

The mechanism in Figure 20 is so arranged that a contact between the members 26 and 27 occurs only in the movement toward the left of the handle 25, and not on the return movement. A link 90 joins a portion of the handle 25 to the segment 91, which is carried by a suitably mounted shaft 92. This shaft also carries a lift arm 93 with a lift pin 94, for the purpose of engaging the shoulder 95, which is a part of the switch finger 26, and thereby lift the switch finger into momentary engagement with the fixed contact 27.

This action occurs when the handle 25 is moved toward the left. The switch finger 26 is operatively mounted on a shaft 96, on which the switch finger is swung to the dotted line position, upon the re-engagement of the shoulder 95, by the lift pin 94 on the reverse movement of the segment 91. At this time, the lift pin 94 engages the other side of the shoulder 95, and thereby swings the switch finger 26 into the dotted line position shown, against the tension of the spring 97, which serves to hold the switch finger in a normal position.

A hook 98, carried by the detent 91, has a suitable connection at 99 to the latch 100, which is normally spring pressed in position to lock the drawer 101 through engagement with the member 102. Upon release of the member 102, the spring 103 actuates the drawer 101 to the open position.

The bell ringing mechanism in Figures 8 and 9 operate with each operation of the actuator shaft 32. A suitable bell 104 is mounted at 105 in Figure 2. A pin 105$^a$ on the shaft 32, is arranged to engage a pawl 106 on the staff 107, which in turn is pivotally mounted at 108.

As the pin 105$^a$ releases the pawl and staff, after having moved the latter to the dotted line position, the spring 109 returns the staff, causing the clapper 110 to ring the bell. The spring 111 provides a resilient mounting for the clapper on the fulcrum 112.

The retarding means for the actuator shaft 32, consists of the arrangement in Figures 1 and 2. This arrangement comprises a cylinder 113 with a minute orifice 114, through which air is admitted when the shaft moves toward the left, and through which it is slowly expelled when the shaft returns toward the right.

There is a piston inside of the cylinder 113, but this piston is not shown in the drawing. The piston rod 115 joins the shaft and the extremity of the pin 84 with which the return arm 81 cooperates. It will be understood at once that when the solenoid 30 is energized and draws the shaft 32 toward the left, air is drawn into the cylinder through the orifice 114. The return movement of the shaft 32 by virtue of the return spring 115, is retarded by the air in the cylinder 113, but which slowly escapes through the orifice 114, ultimately allowing the shaft to assume its original position.

The modification in Figure 22 illustrates the application of the invention to one type of a well known cash register. Here the keys 22$^a$, which correspond to the various keys in Figure 16, are arranged to complete a portion of an electrical circuit by engaging contacts 41$^a$, when they are pushed in.

These contacts are mounted somewhat in the manner shown in Figure 24, on arcuate bases of insulation 40$^a$. The switch consisting of the contacts 26$^a$ and 27$^a$, corresponds to the switch 26, 27 in Figures 15 and 20. When the cash register is set in motion, a moving member 117 engages a portion 118 of the movable switch 27$^a$ causing the closure of a circuit which energizes the release magnet 28, as already fully described in connection with Figure 15.

*The modifications in Figures 25 to 29.*

The arrangement here shown illustrates the method of attaching the auxiliary indicator to another type of well known cash register. This particular type is known as a "one motion" machine. A series of contacts 41$^b$, corresponding to the contacts 41 in Figure 16, are mounted on an insulating face 40$^b$.

When a key 22$^b$ is fully depressed, the indicator rod 119$^b$, which normally rests on the inner end of the key, is carried to the raised position. A lug 120 catches and rests upon the portion 121 of a transversely pivoted frame, and while the indicator rod is in the raised position, the lug 120 engages the adjacent contact 41$^b$, causing the closure of a portion of a circuit in which a release magnet similar to the one 28 in Figure 15, is located.

At a certain time, i. e. when the shaft 122 is rotated, the transverse frame is rocked by the engagement of the arm 123 with the cam 124. The lug 120 is thus released and the indicator rod 119$^b$ is allowed to return to the original position. It will be observed that in this machine, a contact made between one of the members 41$^b$ and one of the indicator rods 119$^b$, is retained until a new sale is made. But this makes no difference in the operation of the indicator because the switch 35 in Figure 15 breaks the circuit as soon as the operation of the indicator is completed.

While the construction and arrangement of the improved cash register indicator as herein described and claimed, is that of a generally preferred form, obviously modifications and changes can be made without departing from the spirit of the invention or the scope of the claims.

I claim:—

1. In combination with an indicator, an auxiliary indicating device comprising a plurality of plates, means for suspending the plates, electro-magnetic means rendered ready to release any plate upon the depression of the corresponding key in the cash register, normally dormant electro-magnetic circuit closing means, rendered operative subsequently to the depression of said key to render the aforesaid electro-magnetic means active to release a plate, electro-magnetic circuit controlling means for said normally dormant electro-magnetic switching means, and movable means forming a part of the cash register, arranged to render said circuit controlling means active upon movement following the depression of a key.

2. A plurality of indicating plates, suspending means for the individual plates, normally inactive electro-magnetic means arranged to actuate individual suspending means, and instrumentalities operative at a predetermined time, to restore all of previously released plates at one time and then energize predetermined ones of said electro-magnetic means to release the corresponding plates.

3. Indicator plate controlling means, comprising an electrically moved member, plate restoring means having a movable operative connection to said member to restore previously released plates on the primary movement of said member, and normally open circuit-controlling means for causing the release of previously selected plates, closed upon the continuance of movement of said member.

4. Indicator plate controlling means, comprising a solenoid arranged to be energized, an actuator member carried by the movable core of the solenoid, a suitably mounted member with a permanent but movable operative connection with the actuator member, to restore previously released plates, upon energization of the solenoid; electro-magnetic plate releasing means, including operatively associated suspending means for individual plates; and circuit closing means operatively associated with said actuator member, for energizing predetermined ones of said electro-magnetic means during the movement of said actuator member, to release corresponding plates.

5. A plurality of banks of indicator plates, one plate of each bank being released to view; individual suspending means for each plate, individual electro-magnetic means for actuating said suspending means, a solenoid controlled movable actuator member, individual means common to all of the plates of each bank, with an operative connection to said actuator member to simultaneously restore all released plates on the first movement of said member, and cash register key controlled means rendering selected ones of the individual electro-magnetic suspending means latent to release corresponding plates, including switch means closed upon the continual movement of said actuator member, thereby rendering said selected suspending means active to release other plates after the first set of plates are restored.

6. An auxiliary indicating device, comprising a plurality of plates, means for suspending the plates, electro-magnetic means for actuating individual suspending means to release selected plates, a solenoid controlled movable, but normally dormant, actuator shaft, operatively associated electro-magnetic means for controlling the circuit of said solenoid, said means having remotely located cash register circuit-controlling means; circuit connections embracing the electro-magnetic suspending means, partially closed by the depression of keys in the cash register, and including normally open switch devices operatively associated with said actuator shaft; and means operatively associated with said shaft for simultaneously restoring all previously released plates, upon the energization of said solenoid by the operation of said remotely located means, said switch means closing on the continuous movement of said shaft to release said previously selected plates.

7. Indicator plate restoring means, comprising a solenoid, with a movable core having an actuator shaft, a rock link with a movable connection to said shaft and lifting means common to all of a bank of plates, when the solenoid is energized to move the shaft in one direction, means including a spring for reversely moving said shaft when the solenoid is deenergized, and means including dash pot and piston devices operatively associated with said shaft for retarding said reverse movement.

8. In combination with a cash register, an auxiliary indicating device, comprising a plurality of plates, with means for suspending the plates; electro-magnetic means controlled by the keys of the cash register for dropping any plate at will, said keys having associated contacts with insulated mountings leading to the individual electro-magnetic means; solenoid controlled actuator means embodied in the indicator, for restoring previously dropped plates and completing circuits through selected electro-magnetic means corresponding to keys depressed, electro-magnetic means for energizing the solenoid, and movable means embodied in the cash register for rendering said electro-magnetic means operative, said means including a handle, a fixed contact, a movable switch finger, and means for causing contact of said finger on one movement of the handle, but evading contact on the return movement of the handle.

OSCAR E. GROSHELL.